E. P. NOYES.
SPRING CONTROL FOR ELECTRICAL MEASURING INSTRUMENTS.
APPLICATION FILED OCT. 18, 1915.

1,235,366.

Patented July 31, 1917.

WITNESSES

INVENTOR

UNITED STATES PATENT OFFICE.

EDWARD PRESCOTT NOYES, OF FORT MONROE, VIRGINIA.

SPRING CONTROL FOR ELECTRICAL MEASURING INSTRUMENTS.

1,235,366.      Specification of Letters Patent.      Patented July 31, 1917.

Application filed October 18, 1915. Serial No. 56,559.

*To all whom it may concern:*

Be it known that I, EDWARD PRESCOTT NOYES, a citizen of the United States, residing at Fort Monroe, in the county of Elizabeth City and State of Virginia, have invented a new Spring Control for Electrical Measuring Instruments, of which the following is a specification.

My invention relates to improvements in the spring control of those types of electrical measuring instruments the torque of which increases at a greater rate than the current or voltage impressed upon them; and the objects of my improvement are, first, to provide a spring controlling device which will exert a counter torque such that the pointer will be deflected nearly uniformly with uniform changes in the current or voltage impressed upon the instrument, thereby securing a nearly uniform scale; second, to afford facilities for the proper adjustment of the pointer; and, third, to provide a means of counterbalancing the moving parts.

I attain these objects by the mechanism illustrated in the accompanying drawing, in which—

Figure 1:
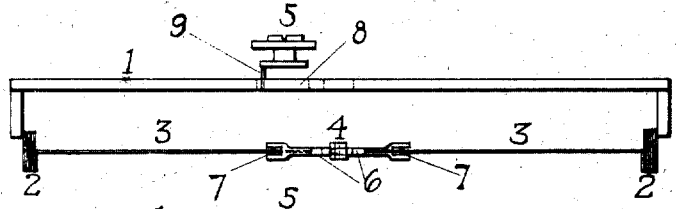
Figure 2:
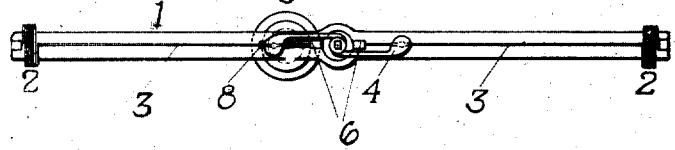
Figure 3:
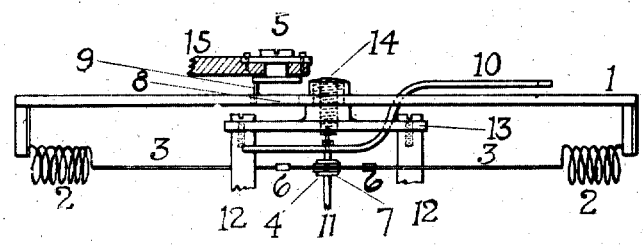
Figure 4:
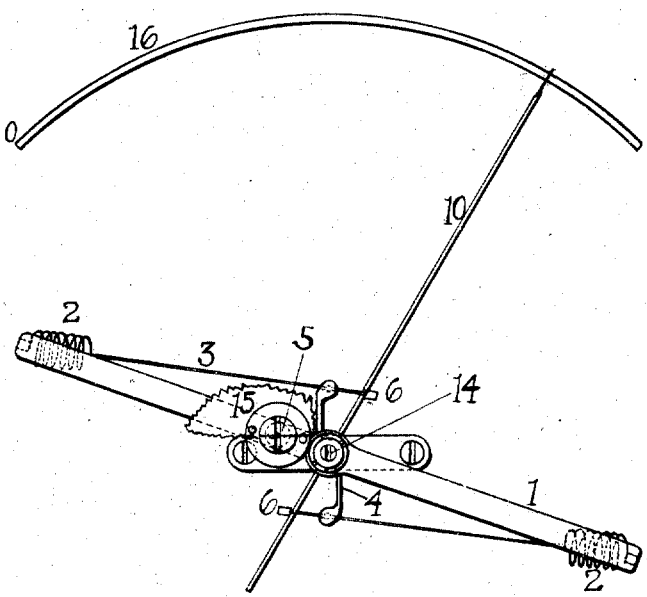

Figure 1 is a side view of the mechanism as it appears disconnected from the rest of the instrument; Fig. 2, a bottom view of the mechanism as it appears disconnected from the rest of the instrument; Fig. 3, a side view of the mechanism connected to such parts of the instrument as it has any connection with; and Fig. 4, a top view of the mechanism and as much of the instrument it has any direct connection with, as it appears when the pointer is deflected through approximately seventy five degrees.

Similar numbers refer to similar parts throughout the several views.

The arm 1 supports one or more springs 2 (two in the present instance) and is so mounted that it can be revolved a few degrees about the axis of the staff 11. The springs 2 may be of any form which exerts a counter force directly proportional to its extension, my method being to use helical springs. The inner ends of the springs 2 are connected to the links 3 the latter being connected to the bearings 7 on the arm 4. The links 3 are counterbalanced by the weights 6, thus relieving the springs 2 of any part of their weight in any position of the instrument. The counterbalancing weights 6 may be dispensed with when the instrument is permanently installed in the same position in which it was calibrated. The arm 4 is secured to the staff 11 at right angles to it and in such position that the pointer 10 will read zero when the springs 2 are relaxed.

The arm 1, and hence the pointer 10, may be adjusted by means of the screw 5, secured to the case of the instrument 15, only a broken section of the latter being shown. This screw 5 supports an eccentric pin 9, fitting into a slot 8 in the arm 1, any motion of the latter being communicated to the pointer 10 through the medium of the springs 2 and links 3, previously referred to; or the arm 1 may be adjusted by any other suitable means, that shown in the drawing forming no part of my present invention.

The staff 11, (only a part of which is shown) supports and is revolved by a movable coil, movable magnetic core, or other means of producing the necessary torque for deflecting the pointer, none of which are shown as they form no part of my present invention. This staff may be mounted as shown (see Figs. 3 and 4) by means of the bearing 14, supported by the yoke 13 and legs 12 (only a part of the latter being shown), or by any other suitable method, that shown in the drawing forming no part of my present invention.

The principle upon which my invention operates is as follows:

As the pointer 10 is deflected from zero by the staff 11, the springs 2 oppose this motion at a constantly increasing rate until the latter part of the scale is reached, when the rate begins to decrease. The counter-torque exerted by the springs 2 is not therefore uniform, but follows very closely the same law that the torque exerted by the instrument follows, and the result is that the pointer is deflected by very nearly uniform increments when the current or voltage impressed upon the instrument is varied by uniform increments, thereby permitting nearly uniform divisions upon the scale 16.

I claim:

1. In a measuring instrument the combination with a supporting spindle, of a rotatably mounted spring supporting arm, a spring carried by said arm, a secondary arm carried by said spindle, and a link connecting said secondary arm and spring.

2. In a measuring instrument the combination with a supporting spindle, of a spring-supporting arm adjustable about the axis of said spindle, a spring carried by said arm, a secondary arm carried by said spindle, and a link connecting said secondary arm and spring.

3. In a measuring instrument the combination with a supporting spindle, of a spring-supporting arm adjustable about the axis of said spindle, springs carried by said arm, secondary arms carried by the said spindle, and links connecting said secondary arms and springs.

4. In a measuring instrument the combination with a supporting spindle, of a spring-supporting arm adjustable about the axis of said spindle, means for varying the angular position of said spring-supporting arm, springs carried by said arm, secondary arms carried by said spindle, and oppositely disposed links connecting said secondary arms and springs.

5. In a measuring instrument the combination with a supporting spindle, of a spring-supporting arm adjustable about the axis of said spindle, springs carried by the outer portions of said spring-supporting arm, secondary arms carried by said spindle, oppositely disposed links connecting said secondary arms and their respective springs in pairs, and counterweights mounted upon said links.

EDWARD PRESCOTT NOYES.

Witnesses:
PHILIP WILNER HUNGSTDT,
WILLIAM DAVID FRAZER.